United States Patent
Gallagher

(10) Patent No.: US 10,091,670 B2
(45) Date of Patent: Oct. 2, 2018

(54) SYSTEM AND MEASUREMENT METHOD FOR A DEDICATED SHORT-RANGE COMMUNICATION ON-VEHICLE COVERAGE SYSTEM

(71) Applicant: Denso International America, Inc., Southfield, MI (US)

(72) Inventor: Brian Gallagher, Carlsbad, CA (US)

(73) Assignee: DENSO International America, Inc., Southfield, MI (US)

( * ) Notice: Subject to any disclaimer, the term of this patent is extended or adjusted under 35 U.S.C. 154(b) by 78 days.

(21) Appl. No.: 15/180,925

(22) Filed: Jun. 13, 2016

(65) Prior Publication Data

US 2016/0366598 A1    Dec. 15, 2016

Related U.S. Application Data

(60) Provisional application No. 62/174,701, filed on Jun. 12, 2015.

(51) Int. Cl.
*H04W 24/02* (2009.01)
*H04W 4/80* (2018.01)
(Continued)

(52) U.S. Cl.
CPC ............ *H04W 24/02* (2013.01); *G08G 1/161* (2013.01); *H04L 5/006* (2013.01);
(Continued)

(58) Field of Classification Search
CPC ..... H04W 24/02; H04W 4/008; H04W 4/046; H04W 4/026; H04W 52/367; G08G 1/161; H04L 5/006
See application file for complete search history.

(56) References Cited

U.S. PATENT DOCUMENTS

2005/0009589 A1\* 1/2005 Oouchi .................. H01Q 1/084
455/575.9
2006/0224295 A1 10/2006 Tengler et al.
(Continued)

FOREIGN PATENT DOCUMENTS

WO    WO-2012-037680 A1    3/2012

OTHER PUBLICATIONS

International Search Report and Written Opinion dated Sep. 21, 2016 in corresponding PCT Application No. PCT/US2016/037237 (9 pages).
(Continued)

*Primary Examiner* — Jamal Javaid
(74) *Attorney, Agent, or Firm* — Harness, Dickey & Pierce, P.L.C.

(57) ABSTRACT

A computerized method characterizes a dedicated short-range communications (DSRC) system that includes at least one DSRC device for use with a vehicle-to-vehicle communication system. The method includes positioning a vehicle under test (VUT) with the DSRC system at a first location and positioning a DSRC instrumentation antenna at a second location spaced apart from the first location. The method includes varying an azimuth angle between the DSRC device and the instrumentation antenna by performing a rotation of the VUT in place at the first location or the instrumentation antenna in a circular path about the first location. The method includes, for multiple azimuth angles, testing receive performance of the DSRC system by transmitting DSRC packets through the instrumentation antenna to the DSRC system, estimating an error rate indicating a level of success of DSRC packets being received by the DSRC system, and recording the error rate for each angle.

19 Claims, 14 Drawing Sheets

(51) Int. Cl.
  *G08G 1/16*   (2006.01)
  *H04L 5/00*   (2006.01)
  *H04W 4/02*   (2018.01)
  *H04W 4/04*   (2009.01)
  *H04W 52/36*  (2009.01)
  *H04L 12/26*  (2006.01)
  *H04W 84/12*  (2009.01)

(52) U.S. Cl.
  CPC ...... *H04L 43/0823* (2013.01); *H04L 43/0894* (2013.01); *H04W 4/026* (2013.01); *H04W 4/046* (2013.01); *H04W 4/80* (2018.02); *H04W 52/367* (2013.01); *H04L 43/50* (2013.01); *H04W 84/12* (2013.01)

(56) References Cited

U.S. PATENT DOCUMENTS

2010/0256852 A1   10/2010   Mudalige
2014/0207327 A1    7/2014   Blair

OTHER PUBLICATIONS

Keyvan Ansari et al., "Vehicle-to-Vehicle Real-Time Relative Positioning Using 5.9 GHz DSRC Media", Vehicular Technology Conference (VTC Fall), 2013 IEEE 78th, pp. 1-7, Sep. 2, 2013.

\* cited by examiner

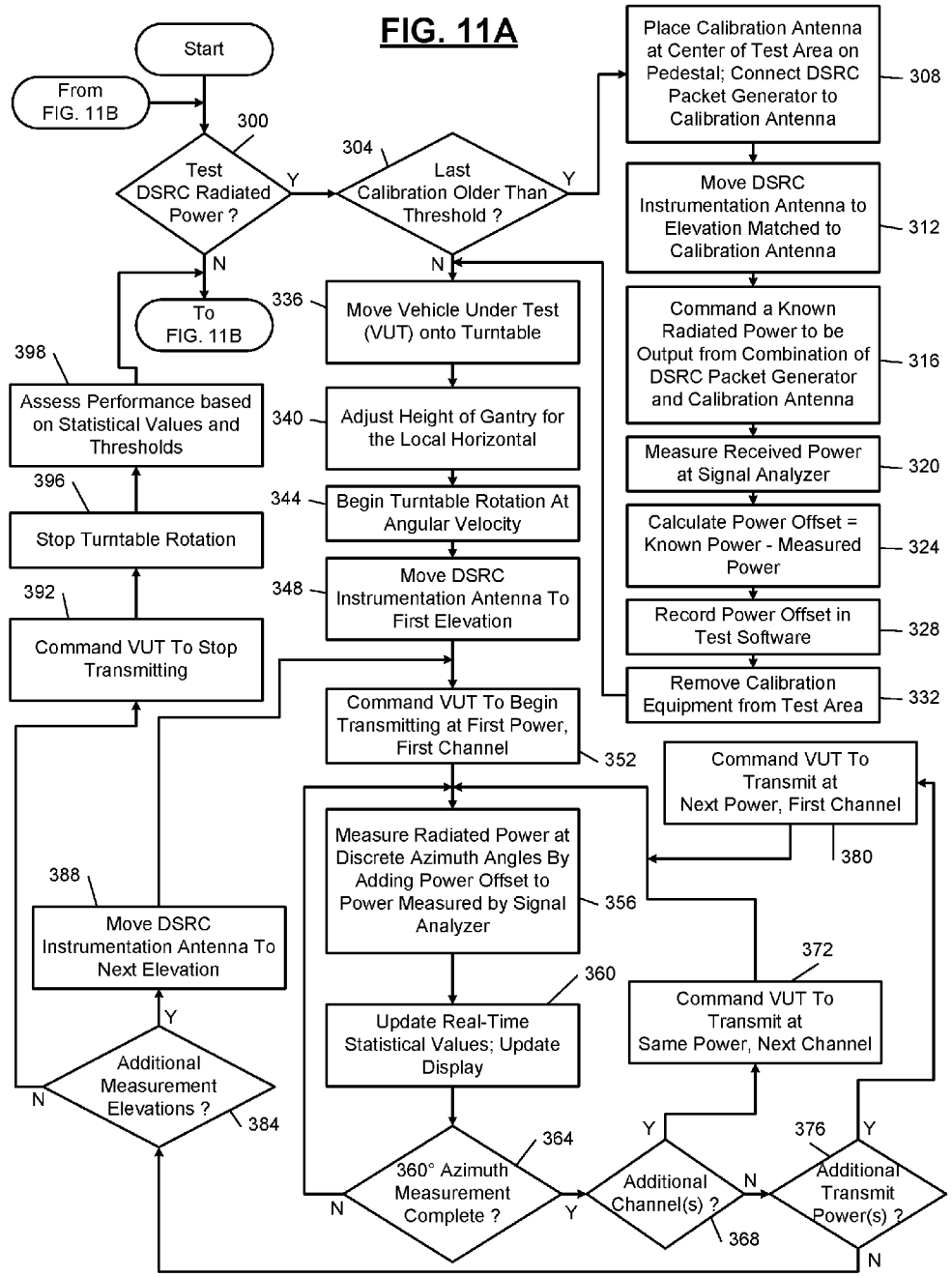

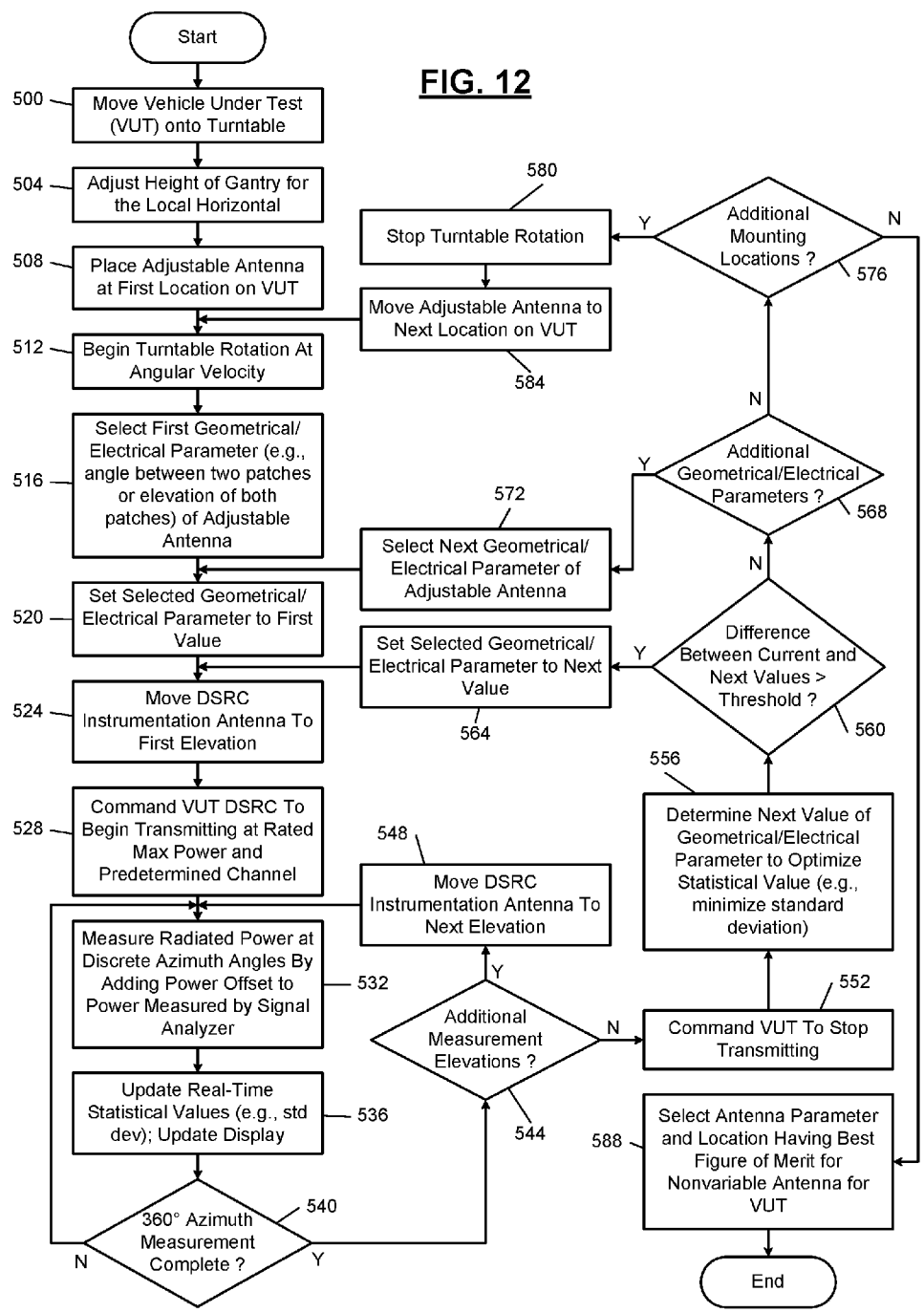

SYSTEM AND MEASUREMENT METHOD FOR A DEDICATED SHORT-RANGE COMMUNICATION ON-VEHICLE COVERAGE SYSTEM

CROSS-REFERENCE TO RELATED APPLICATIONS

This application claims the benefit of U.S. Provisional Application No. 62/174,701, filed on Jun. 12, 2015.

FIELD

The present disclosure relates to short-range inter-vehicle wireless communications and more particularly to system characterization and antenna design for short-range inter-vehicle wireless communications.

BACKGROUND

This section provides background information related to the present disclosure and is not necessarily prior art.

In 2014, the National Highway Traffic Safety Administration (NHTSA) initiated rulemaking that proposed to create a new Federal Motor Vehicle Safety Standard (FMVSS), FMVSS No. 150, that requires vehicle-to-vehicle (V2V) and vehicle-to-infrastructure (V2I) communication capability for light vehicles. In preparation for FMVSS No. 150, minimum performance requirements for V2V/V2I devices and messages were created. One desired outcome of FMVSS No. 150 is that by mandating performance requirement in all new vehicles, the development of a wide variety of vehicle applications would be advanced, including such applications as crash-imminent collision avoidance, wireless control of vehicle platoons, and control and sensor sharing among autonomous vehicles.

One proposed performance requirement of FMVSS No. 150 is the requirement of new light vehicles to be equipped with at least one dedicated short-range communications (DSRC) device, which operates on short-range wireless communication channels designed for automotive use. V2V communication would take place on a radio signal at 5.9 GHz, with the DSRC devices of the vehicles transmitting and receiving radio signals in a 75 MHz band around 5.9 GHz.

Such a system of never-before deployed 5.9 GHz V2V links between vehicles has no precedent in automotive history. Further, 5.9 GHz DSRC radio coverage around a vehicle is often non-circular, with holes in the coverage that allow degradation in the V2V link range in certain directions and ultimately impact the delivery of crash warnings and driver alerts, control of vehicle platoons, and the reliability of sensor sharing among autonomous vehicles. Thus, there is an important need to design and validate 5.9 GHz DSRC on-vehicle systems, optimize on-vehicle coverage, and provide methods of measurement.

SUMMARY

This section provides a general summary of the disclosure, and is not a comprehensive disclosure of its full scope or all of its features.

A computerized method characterizes a dedicated short-range communications (DSRC) system that includes at least one DSRC device for use with a vehicle-to-vehicle communication system. The method includes positioning a vehicle under test (VUT) with the DSRC system at a first location and positioning a DSRC instrumentation antenna at a second location spaced apart from the first location. The method includes varying an azimuth angle between the DSRC device and the instrumentation antenna by performing a rotation of (a) the VUT in place at the first location or (b) the instrumentation antenna in a circular path about the first location. The method includes, for multiple azimuth angles, testing receive performance of the DSRC system by transmitting DSRC packets through the instrumentation antenna to the DSRC system, estimating an error rate indicating a level of success of packets being received by the DSRC system, and recording the error rate for each angle.

A system is for characterizing a dedicated short-range communications (DSRC) system that includes at least one DSRC device for use with a vehicle-to-vehicle communication system. The system includes a DSRC instrumentation antenna positioned at a second location spaced apart from a first location. A vehicle under test (VUT) is positioned at the first location. The VUT includes the DSRC system. The system includes a DSRC packet generator configured to selectively transmit DSRC packets to the DSRC system through the DSRC instrumentation antenna. The system includes a signal analyzer configured to selectively measure radiated power from the DSRC system through the DSRC instrumentation antenna. The system includes a control system. The control system is configured to vary an azimuth angle between the DSRC instrumentation antenna and the DSRC system by rotating (a) the VUT in place at the first location while leaving the DSRC instrumentation antenna fixed in the second location or (b) the DSRC instrumentation antenna in a circular path about the first location while leaving the VUT fixed in the first location. The control system is configured to command the DSRC packet generator to transmit DSRC packets to the DSRC system through the DSRC instrumentation antenna and, for each azimuth angle of a plurality of specified azimuth angles, receive and record an error rate corresponding to the specified azimuth angle from the DSRC system. The error rate indicates a level of success of the DSRC packets being received by the DSRC system. The control system is configured to command the DSRC system to transmit DSRC packets to the DSRC instrumentation antenna and, for each azimuth angle of the plurality of specified azimuth angles, (i) measure a radiated power received through the DSRC instrumentation antenna at the signal analyzer and (ii) record a radiated power value corresponding to the specified azimuth angle based on the measured radiated power.

A computerized method allows automated antenna design for a dedicated short-range communications (DSRC) system that includes at least one DSRC device for use with a vehicle-to-vehicle communication system. The method includes positioning a vehicle under test (VUT) at a first location. The VUT includes the DSRC system. The method includes positioning a DSRC instrumentation antenna at a second location spaced apart from the first location. The method includes selecting a first value for a first parameter of a configurable antenna of the DSRC system. The method includes configuring the first parameter of the configurable antenna to attain the selected value. The method includes varying an azimuth angle between the DSRC device and the DSRC instrumentation antenna by performing a rotation of the VUT in place at the first location while leaving the DSRC instrumentation antenna fixed in the first location. The method includes performing a transmission test of the DSRC system by, at each of a plurality of specified azimuth angles, instructing the DSRC system to transmit DSRC packets to the DSRC instrumentation antenna, measuring a radiated power received through the DSRC instrumentation antenna, and recording a radiated power value corresponding to the specified azimuth angle based on the measured radiated power. The method includes determining a statistical value representative of the radiated power values for the plurality of specified azimuth angles. The method includes adjusting the selected value to optimize the statistical value. The method includes selectively repeating the configuring, the varying, the performing, the determining, and the adjusting until an optimized value for the first parameter is determined.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 4:
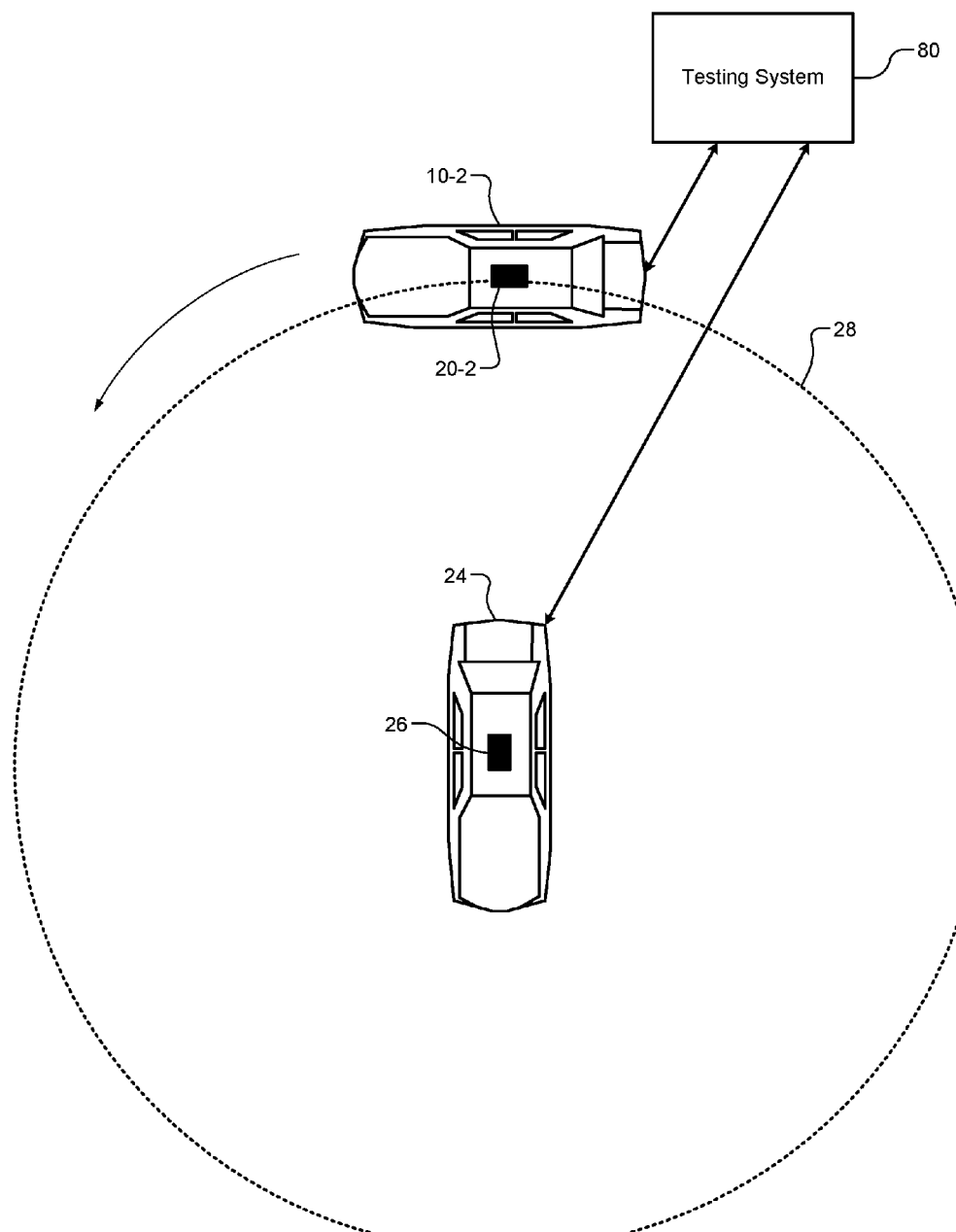

FIG. 4 illustrates a circular drive path test embodiment of measuring DSRC coverage. The vehicle in the center is the vehicle-under-test (VUT). The vehicle driving around the VUT is part of the test setup.

Figure 5:
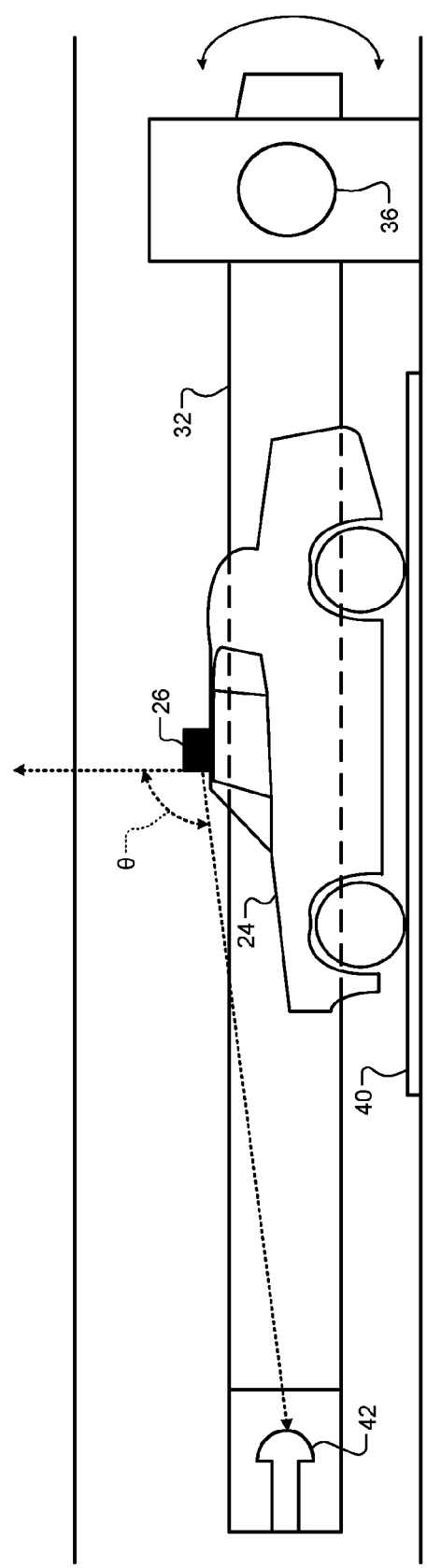

FIG. 5 is a side view of a vehicle-on-rotator embodiment of measuring DSRC coverage.

Figure 6A:
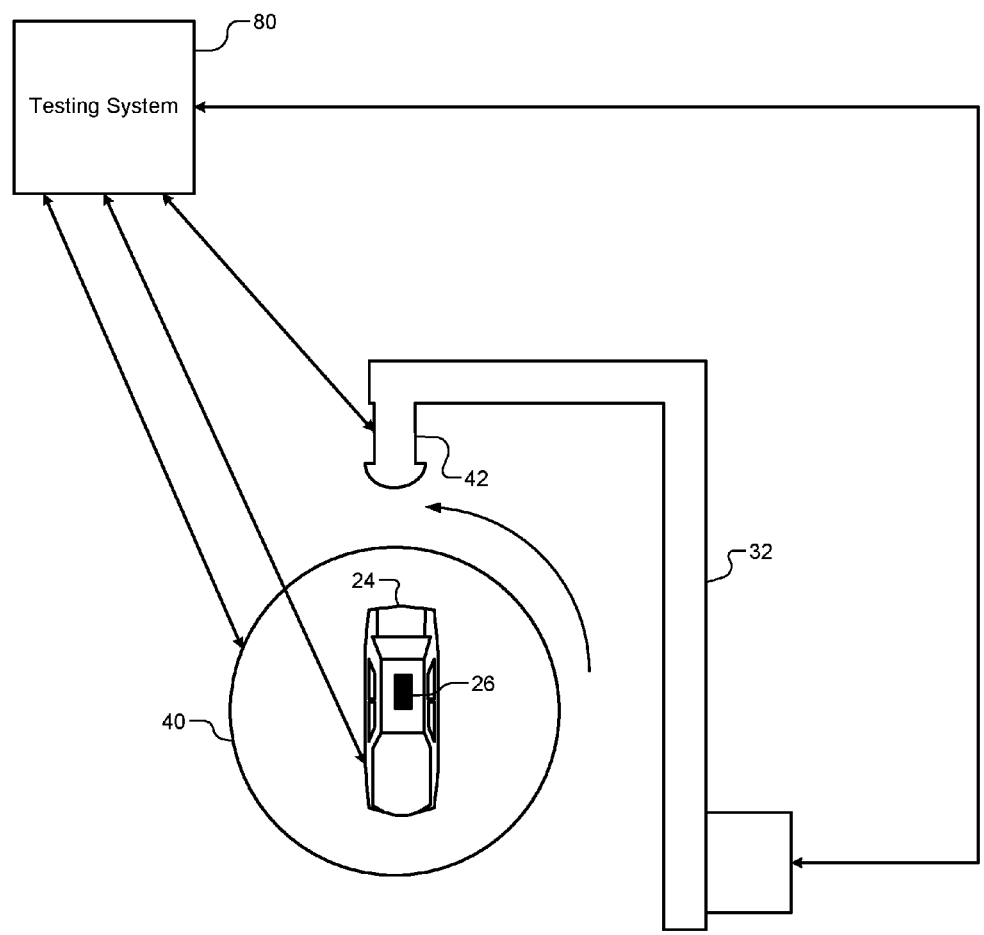

FIG. 6A is a top view of a vehicle-on-rotator embodiment of measuring DSRC coverage.

Figure 6B:
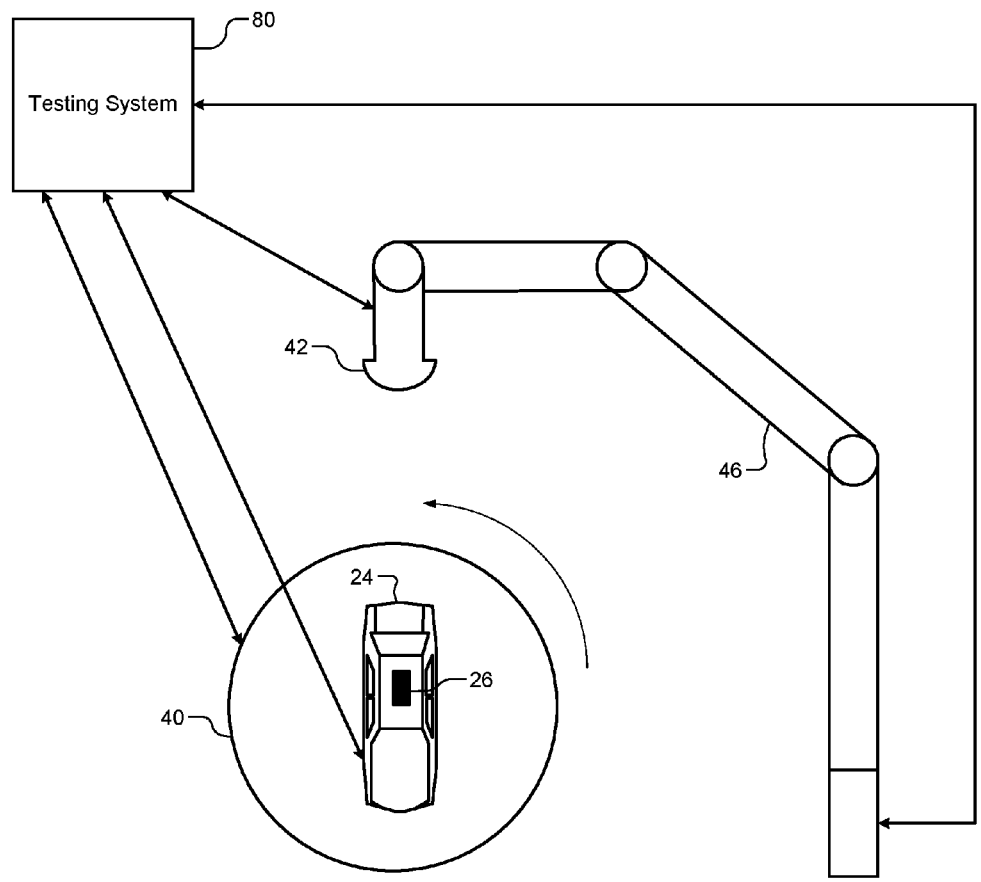

FIG. 6B is another top view of a vehicle-on-rotator embodiment of measuring DSRC coverage.

Figure 7:
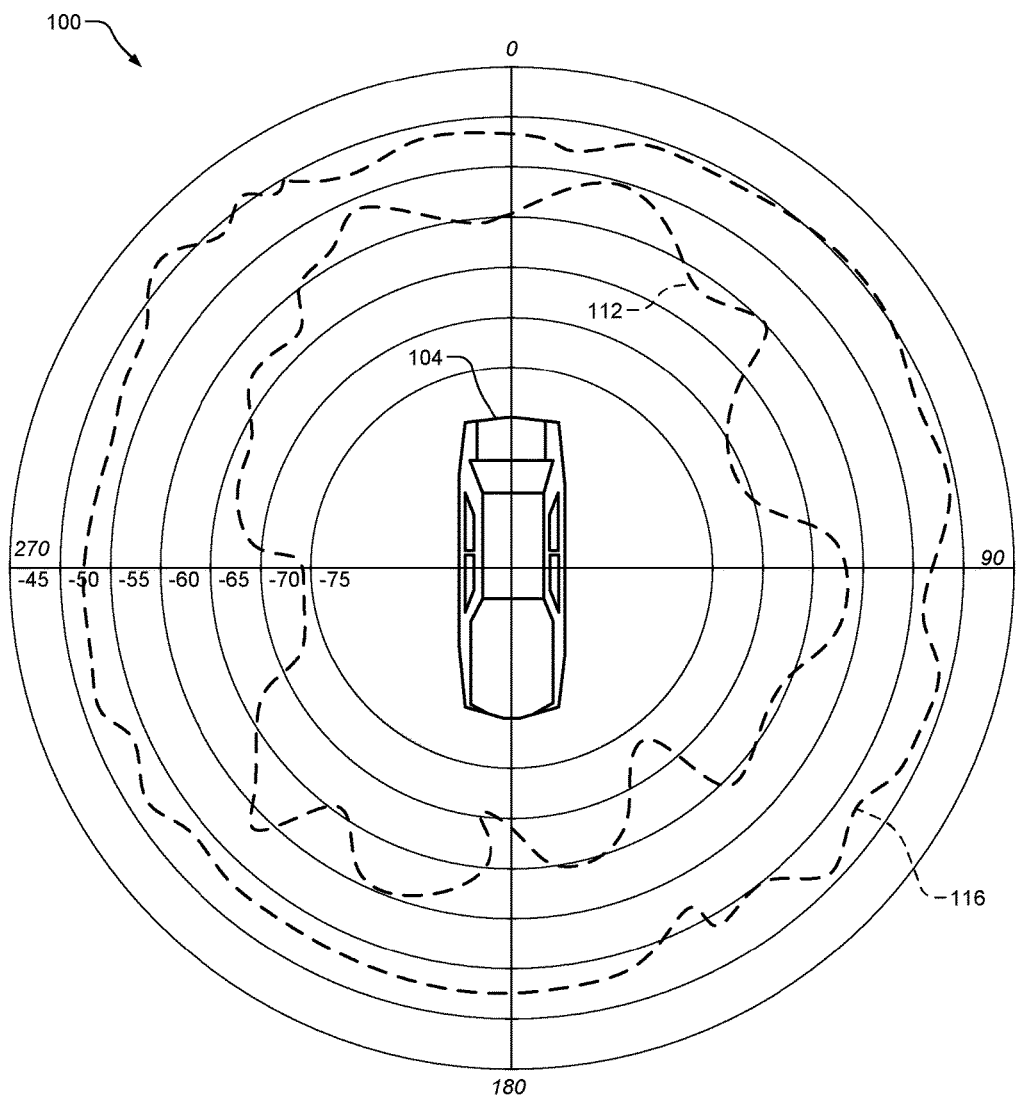

FIG. 7 is a polar plot depicting example coverage area using the circular drive path test embodiment of measuring DSRC coverage described in FIG. 4. The graph is a reported received signal strength at the vehicle-under-test.

Figure 8:
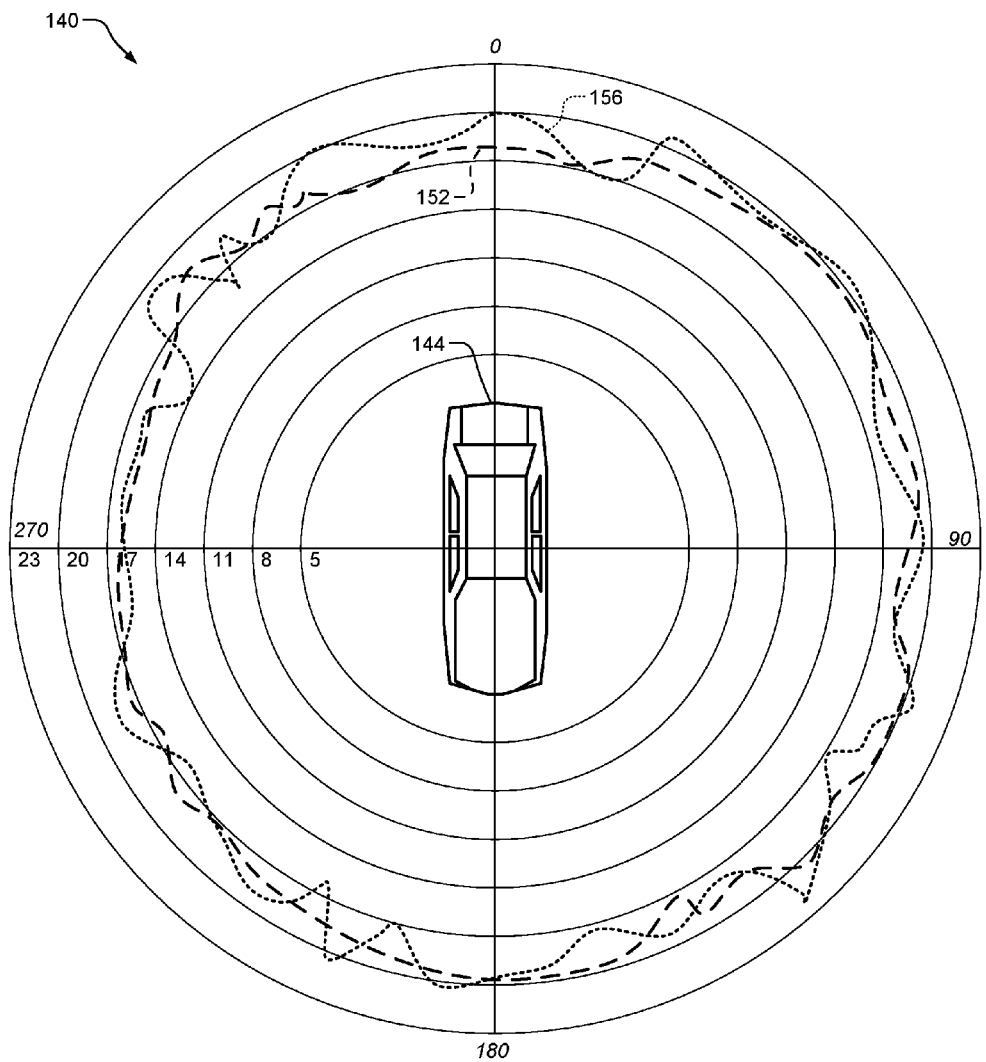

FIG. 8 illustrates an example display of radiated power from the vehicle using the vehicle-on-rotator method of measuring DSRC coverage described in FIG. 5 and FIG. 6.

Figure 9:
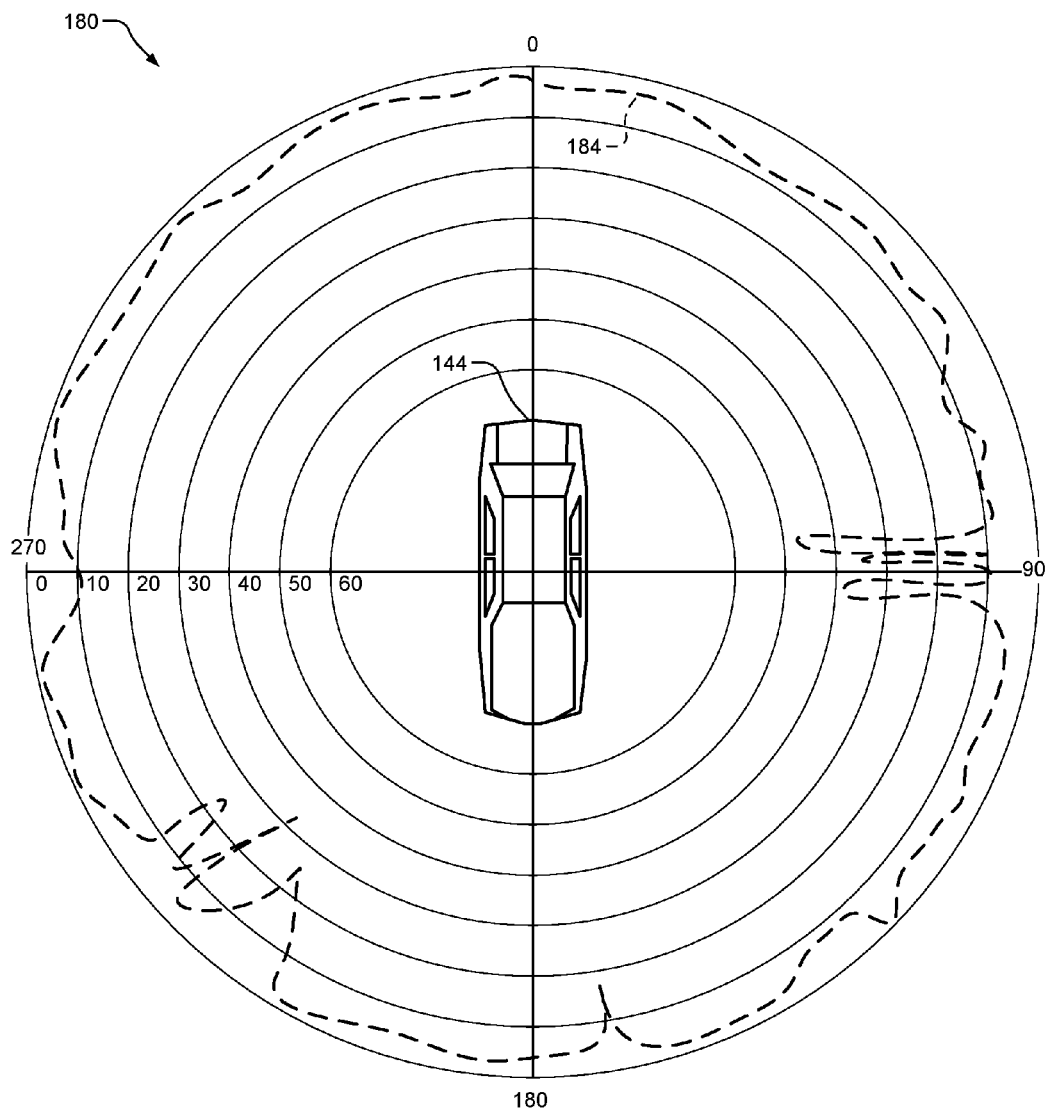

FIG. 9 illustrates an example display of a packet error rate at the vehicle using the vehicle-on-rotator method of measuring DSRC coverage.

Figure 10:
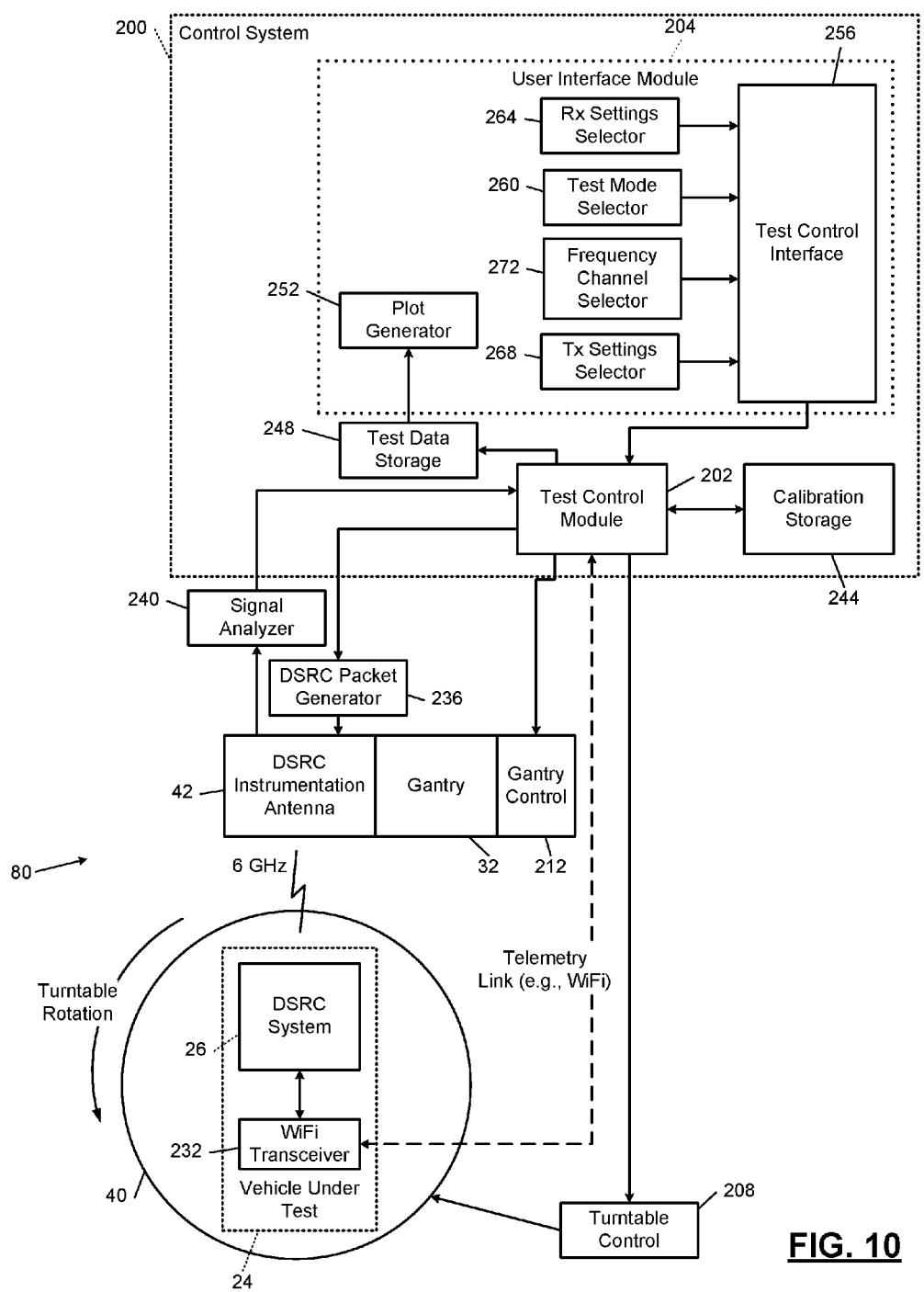

FIG. 10 is a functional block diagram of the elements of the vehicle-on-rotator and the circular drive path test that includes a control system for managing the measurement.

Figure 11B:
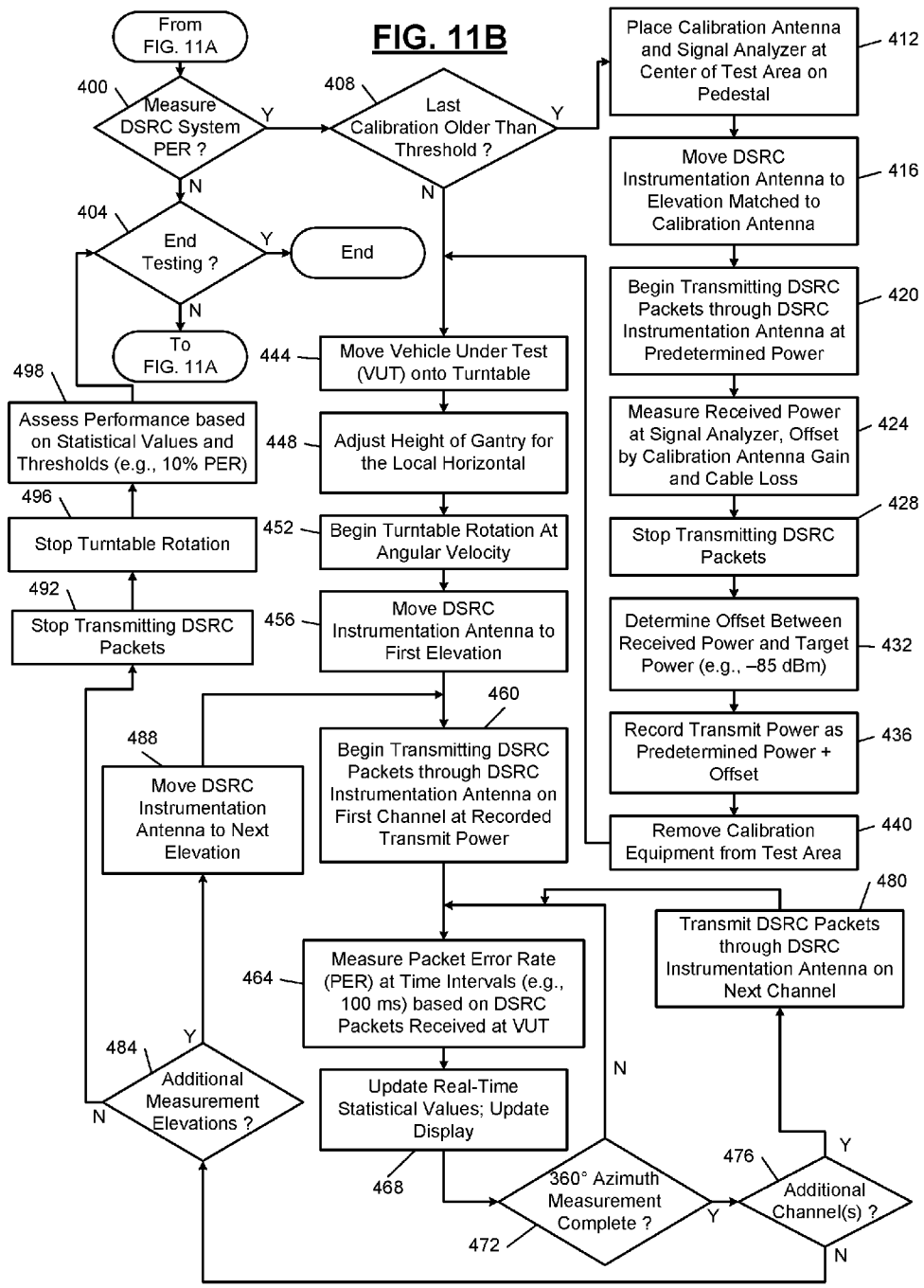

FIG. 11A and FIG. 11B together are a flowchart showing an example measurement method.

FIG. 12 is a flowchart showing a method to design DSRC antennas while on the vehicle by optimizing both the design parameters and the on-vehicle coverage.

Corresponding reference numerals indicate corresponding parts throughout the several views of the drawings.

DETAILED DESCRIPTION

The present disclosure relates to short-range inter-vehicle wireless communications and more particularly to a novel method of designing inter-vehicle antennas and a novel method of direct measurement of on-vehicle coverage for vehicles with a communication system used for short-range inter-vehicle wireless communications. Such a design and measurement method can be used for on-vehicle coverage research or for formal certification of vehicles as acceptable for deployment.

With the implementation of V2V and V2I DSRC communication capability between light vehicles, it is necessary to ensure that the radio signals transmitted from the light vehicles are able to effectively transmit and receive DSRC radio signals at a variety of transmission powers, over a variety of transmission channels, and with circular coverage around the vehicle periphery without coverage holes. The accurate transmission and reception of the DSRC signals is important to V2V and V2I communication, since inaccurate transmission and/or reception of DSRC could lead to vehicle collisions.

Another example of the consequence of the loss of DSRC signal reception is the signal lost during a left-turn with oncoming traffic. A properly operating DSRC system will advise the turning vehicle when a safe gap in oncoming traffic occurs. Poor reception due to inadequate circular coverage may cause no warning to be issued in moments when no safe passage exists. Further, a method of measurement that ensures that the DSRC system is properly able to transmit and receive radio signals at a variety of different powers and across all DSRC channels is needed to ensure that safety-critical applications on all channels will work properly. Commanded reductions in radiated power level are required to ensure that over-the-air packet congestion control schemes work properly during high vehicle density scenarios such as traffic jams.

The methods of measurement of DSRC systems of the present disclosure can be used to ensure that the transmission and receiving functions of the DSRC system are in compliance with certain specifications, which may be dictated by an industry standard requirement such as FMVSS No. 150. By using the methods of measurement of the present disclosure, one may be able to determine whether the DSRC system of a vehicle needs to be modified, such as by adjusting an antenna mounting location, adding additional antennas to the DSRC system, or using higher-gain antenna elements to overcome the use of nonmetals and glass on the vehicle body that may interfere with the functionality of the DSRC system. Other interfering elements may include a running internal combustion engine, which may include various electronic communications as well as electronic ignition. To test for this interference, the engine may be placed in a running state during DSRC system testing. For example, the running state may be idling or may be running at a predetermined engine speed (that is, revolutions per minute or RPM).

Additionally or alternatively, the methods of measurements of DSRC systems of the present disclosure can be used to assist one in the antenna design of a vehicle. As an example, if one positions an antenna on the vehicle and ultimately desires to position the antenna at that location, one may be to modify the antenna design if the antenna is not able to transmit a signal at a threshold power. Alternatively, one may also modify the antenna design if the antenna is below a threshold packet error rate and thus is not able to receive signals accurately. Modifications to the antenna design may include physical or electrical offset between antenna elements, changes to an antenna length, shape (e.g., folded dipole), and type of conductive metal ground plane.

Figure 1:
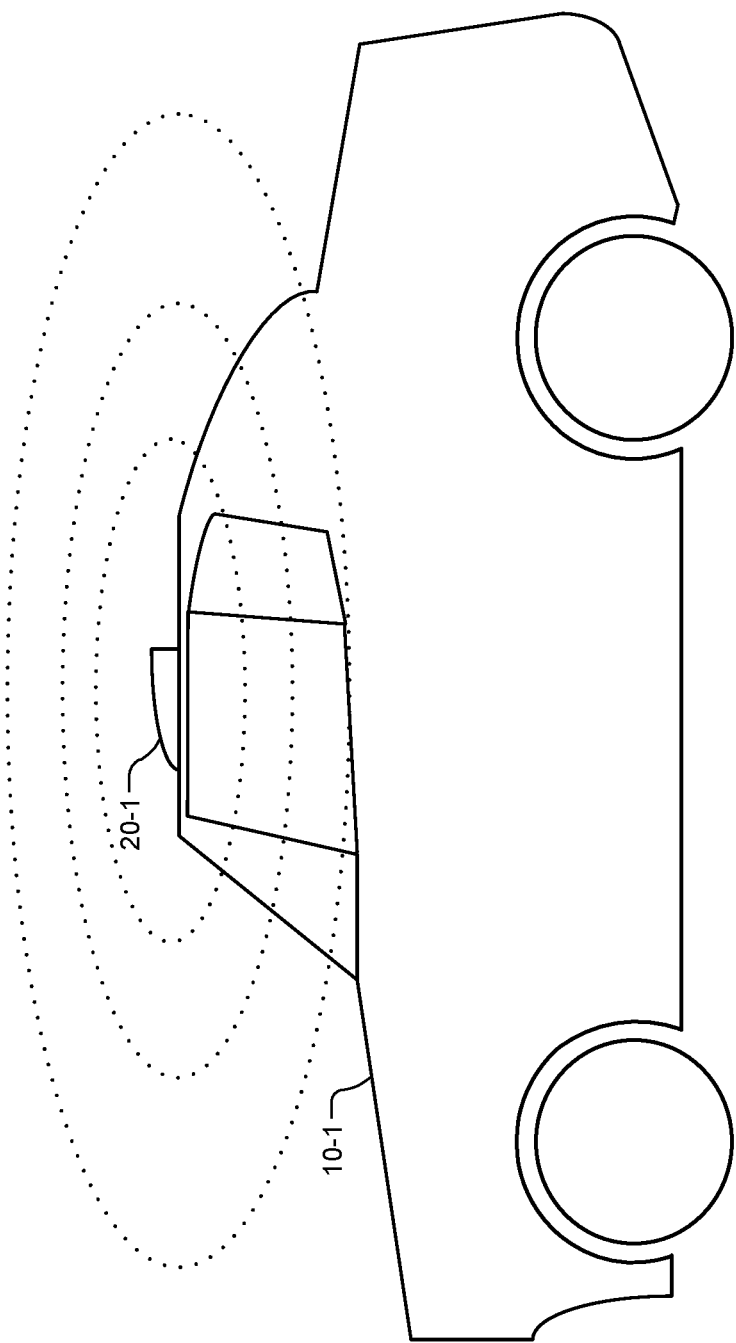
FIG. 1 illustrates a vehicle that is equipped with a V2V system that is in compliance with FMVSS No. 150.

FIG. 1 illustrates a vehicle 10-1 that is equipped with a V2V system—specifically a DSRC system 20-1. The DSRC system 20-1 is configured to deliver and receive early warnings of accidents or driving hazards between other vehicles that are also equipped with V2V systems. The DSRC system 20-1 may communicate with other vehicles equipped with a V2V system by using a 75 MHz band around a 5.9 GHz frequency. An example embodiment of the DSRC system 20-1 is described below with reference to FIG. 3. In an example embodiment, all of the components of the DSRC system 20-1 may be located at one or multiple locations on the roof of the vehicle 10-1. In other embodiments, some of the components may be located in the interior of the vehicle 10-1.

Figure 2:
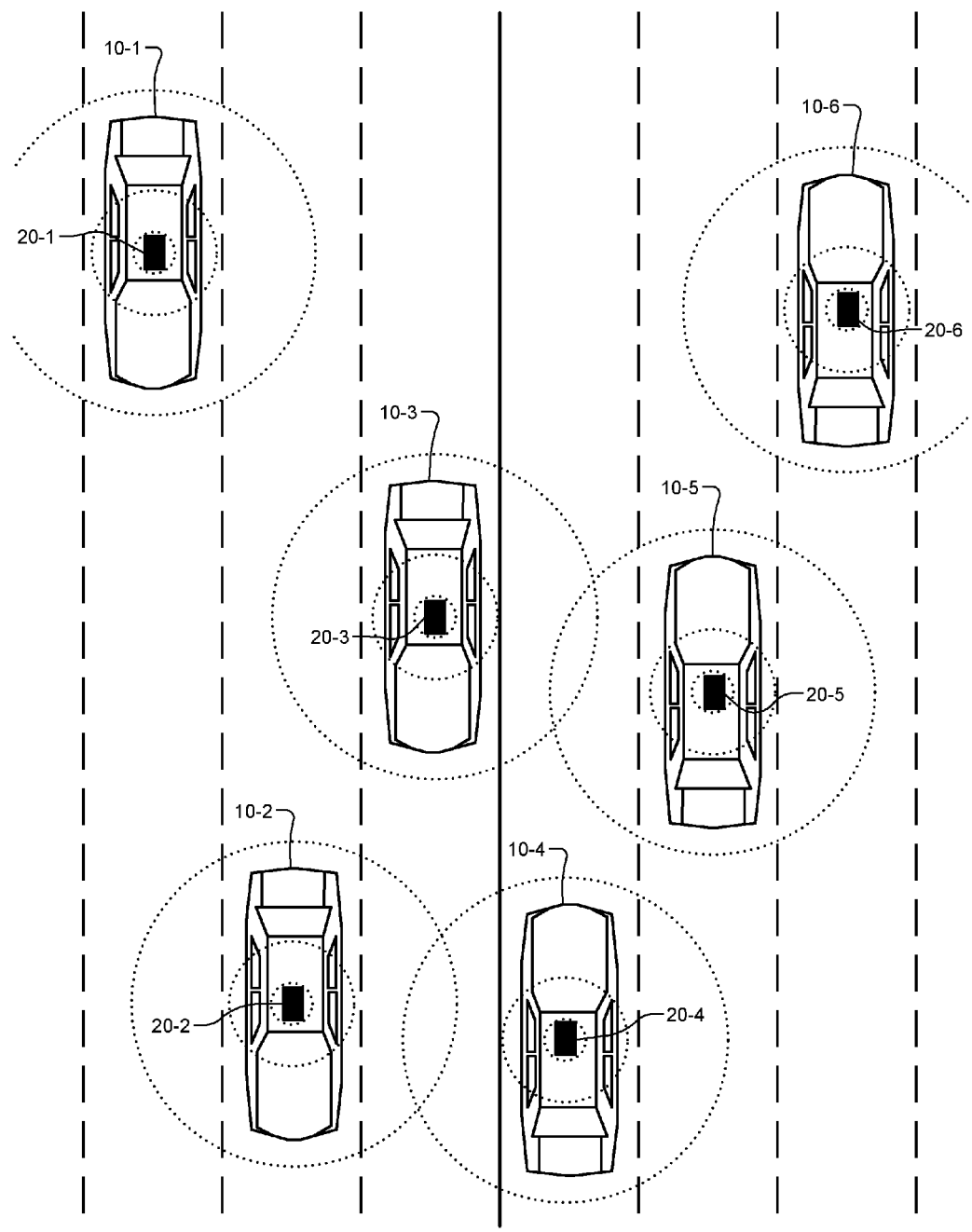
FIG. 2 illustrates communication in all directions among multiple vehicles equipped with DSRC systems.

FIG. 2 illustrates vehicles 10-1, 10-2, . . . 10-6 (collectively referred to as vehicles 10) that are respectively equipped with DSRC systems 20-1, 20-2 . . . 20-6 (collectively referred to as DSRC systems 20). The DSRC systems 20 may operate in both line-of-sight (LOS) and non-line-of-sight (NLOS) conditions, thereby allowing the DSRC systems 20 of the vehicles 10 to communicate warnings and driving hazards even with blockage from intervening vehicles, blind corners, or other roadside infrastructure. Wireless signals from each of the DSRC systems 20 are illustrated radiating outward in a perfect circular pattern, indicated by dotted circles in FIG. 2. Such perfect coverage is not attainable in real-world conditions due to the challenge of 6 GHz coverage. In reality, some DSRC systems 20 may have some weak spots or holes in coverage. Thus, the attainment of better pseudo-circular coverage is the motivation for this disclosure.

In real world situations, since the radio coverage around the vehicle 10 may be non-circular, the effective link range between vehicles may be reduced in certain directions and may ultimately impair the delivery of alerts and warnings. The link range may be degraded by the shape of a vehicle body and blockage from the curved roof; the use of metals, nonmetals, and/or glass on the vehicle body; roof blockage, including racks, bags, luggage carriers, etc.; the sizes, locations, and number of antennas; interference from other wireless antenna elements in the same sharkfin package, such as LTE/cellular; and weaker coverage below the vehicle's horizon.

However, these factors may be mitigated by countermeasures discussed in further detail in the disclosure and implemented in the DSRC systems 20, such as the implementation of a dual-chain transmit (Tx) and diversity receive (Rx) mode; antenna elements positioned on glass, headliner, plastic, and/or other surface of the vehicle in addition to antenna elements located on the roof; Class-C radio Tx output power and −95 dBm Rx sensitivity; additional amplifiers in a Tx/Rx signal path; and low-loss radio frequency (RF) cable assemblies that connect antennas to optional amplifiers or to the DSRC radio(s).

Figure 3:
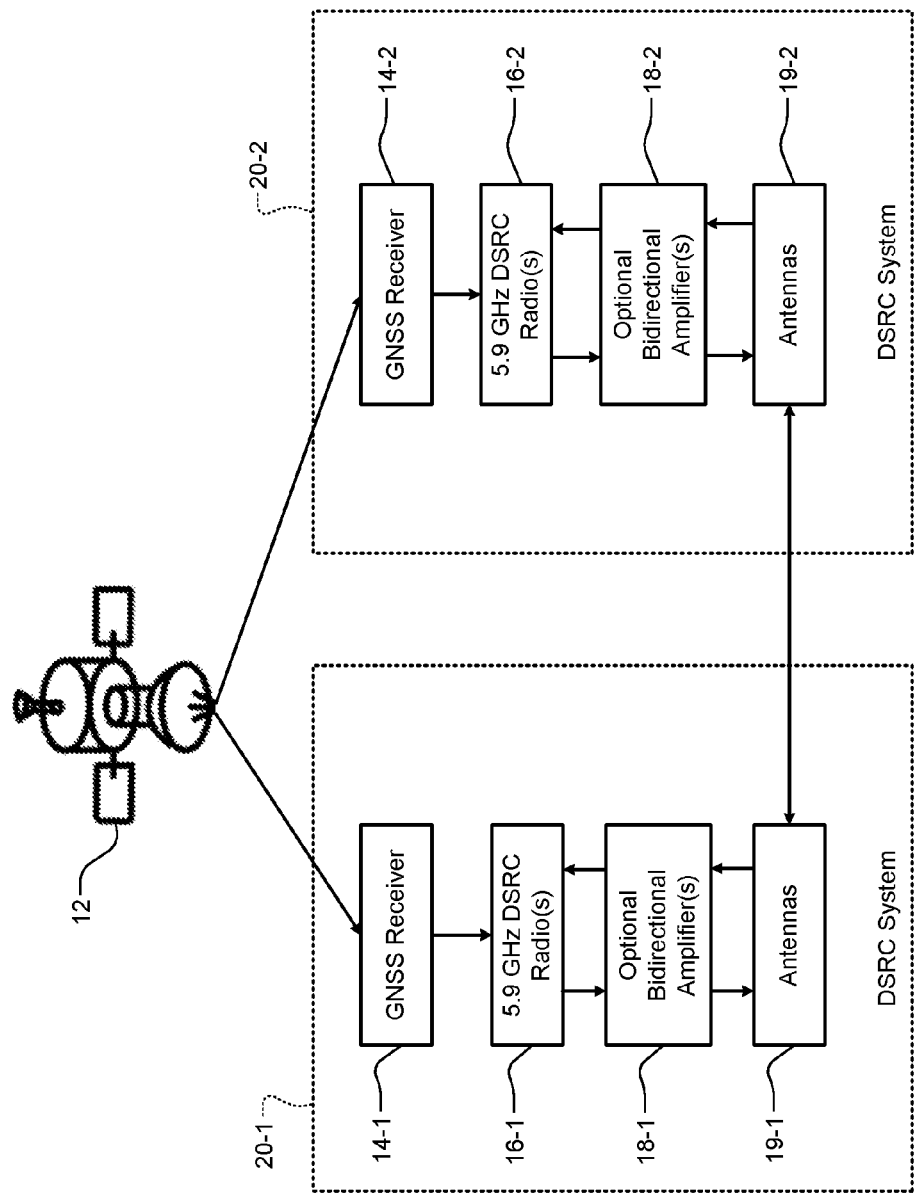
FIG. 3 illustrates an example embodiment of a DSRC system. It is over-simplified, but includes at least one DSRC receiver, GNSS receiver, antenna, RF cable, and optional bidirectional amplifier elements.

FIG. 3 illustrates an example embodiment of a pair of V2V systems, the DSRC systems 20-1 and 20-2. The DSRC systems 20-1 and 20-2 include, respectively, Global Navigation Satellite System (GNSS) receivers 14-1 and 14-2, 5.9 GHz DSRC radio(s) 16-1 and 16-2, optional bidirectional amplifier(s) 18-1 and 18-2, and antennas 19-1 and 19-2. The GNSS receivers 14-1 and 14-2 receive positioning and time information from a GNSS satellite 12. As an example, the GNSS receivers 14 and the GNSS satellite may be a GPS receiver and GPS satellite, respectively. The 5.9 GHz DSRC radio(s) 16-1 and 16-2 subsequently transmit signals representing position and/or time data from the GNSS receiver 14-1 and 14-2 in basic safety messages (BSMs) through the antennas 19-1 and 19-2, respectively. The optional bidirectional amplifier(s) 18-1, electrically coupled between the 5.9 GHz DSRC radio(s) 16-1 and the antenna 19-1 via a 6 GHz low loss RF cable, may increase the range of the signal generated by the 5.9 GHz DSRC radio(s) 16-1 and may also increase the lower boundary of signal strength detectable by the antenna 19-1. The antenna 19-1 may also receive signals from other DSRC systems. The antenna 19-1 may include multiple antennas that may be placed at different locations on the vehicle 10-1.

An electronic control module (not shown) may be configured to communicate to a vehicle operator (not shown) information based on the received positioning and/or time data. In various implementations, the electronic control module may also be configured to communicate a hazard or safety alert to another vehicle. In response to a hazard communicated via the DSRC system 20-1, the electronic control module may be configured to alert the vehicle operator of the hazard and instruct the vehicle operator to decelerate or take precautions.

FIG. 4 illustrates a circular drive path method of measuring DSRC coverage. In an example embodiment, a vehicle under test (VUT) 24 equipped with a DSRC system 26 is under test and is positioned at a first location. The second vehicle 10-2 is initially positioned at a second location along a circular path 28. Prior to positioning the first vehicle 10-1 at the first location, a calibration antenna may be placed at the first location to calibrate the measurements performed by the second vehicle 10-2.

After calibration, the VUT 24 remains at the first location throughout the entirety of the measurement process, while the second vehicle 10-2 drives around the VUT 24 on the circular path 28 until returning to the second location (i.e., the second vehicle 10-2 makes one lap around the VUT 24). As the second vehicle 10-2 drives around the VUT, a testing system 80 determines the transmission signal strength (Tx power) by either direct receive signal strength (RSS) measurement in the DSRC system 20-2 of the second vehicle 10-2 or by power measurement instrumentation in the second vehicle 10-2 via the DSRC system 20-2 at various locations along the circular path 28. The testing system 80 is described in further detail with reference to FIG. 10.

In various implementations, the second vehicle 10-2 may complete more than one lap around the VUT 24. The testing system 80 may determine the Tx power or RSS by calculating an average, median, or other statistical analysis measure across the laps. As an example, if the second vehicle 10-2 drives around the VUT 24 ten times, the testing system 80 may be configured to measure the Tx Power or RSS of the DSRC system 26 ten times (one measurement for each rotation) at various locations along the circular path 28 of the second vehicle 10-2 and subsequently calculate an average Tx power at the various locations along the circular path 28. In other embodiments, the second vehicle 10-2 may be replaced by a device that can traverse a circular path around a fixed point. As an example, the second vehicle 10-2 may be replaced by a robot, flying drone, dolly, or bicycle.

FIG. 5 illustrates a side view of another implementation in which the vehicle 10-1 is positioned at a center of a turntable 40, and the DSRC instrumentation antenna 42 is mounted on a gantry 32.

The gantry 32 is configured to set the height of the DSRC instrumentation antenna 42 relative to the DSRC system 26 of the VUT 24, thereby forming an elevation angle θ. The elevation angle θ is defined as the angle between a segment extending between an antenna of the DSRC system 26 and the DSRC instrumentation antenna 42 and a ray beginning at the DSRC system 26 and extending vertically (that is, perpendicularly from a plane on which the VUT 24 is resting). A range of elevation angles θ are used to characterize on-vehicle coverage when a vehicle is located at a different elevation due to a hill, valley, on-ramp, off-ramp, or other geological or man-made formation. The elevation angle θ may be adjusted by rotating the gantry 32 around a first joint 36 of the gantry 32. In an example embodiment, the elevation angle θ may be controlled between 80° and 96°.

In FIG. 6A, a testing system 80 controls gantry arm 46 that has the same mechanical configuration of the gantry 32 in FIG. 5. The gantry arm 46 supports the DSRC instrumentation antenna 42 and may have multiple axes of freedom. The positioning of the DSRC instrumentation antenna 42 may be controlled by the gantry arm 46 according to instructions from the testing system 80. The testing system 80 provides signals for the DSRC system 26 to transmit and also for the power measurement instrumentation to receive the signals and measure radiated power. Further, the testing system 80 communicates with the VUT 24. A local controller (software) in the DSRC system 26 of the VUT 24 may control the DSRC system 26 of the VUT 24 during testing. In FIG. 6B, a testing system 80 controls gantry arm 46, which is, for illustration purposes only, a different mechanical configuration than the gantry 32 of FIG. 5. However, the testing system 80 controls functions in the same manner as described above with reference to FIG. 6B.

FIG. 7 is a polar plot depicting example coverage area using the circular drive path test embodiment of measuring DSRC coverage described in FIG. 4. The graph shows the reported received signal strength at the vehicle-under-test. An image 104 of a vehicle may be drawn on the plot 100.

Trace 112 depicts measured coverage using a multiband antenna, and trace 116 depicts measured coverage using a sharkfin antenna. In this example plot, multiple graphs may be shown at a given elevation angle (such as the horizon) to compare different antennas or radios or multiple graphs from the same DSRC system may be plotted and statistically analyzed across a selected elevation range to certify vehicles with acceptable DSRC systems or for coverage research. The sharkfin trace 116 depicts more uniform circular coverage relative to the trace 112 of the multiband antenna. Based on these results, the sharkfin antenna may be preferred to the multiband antenna for use in a DSRC system for the vehicle under test.

FIG. 8 illustrates an example plot 140 of radiated power transmitted from DSRC systems as a function of azimuth angle. An image 144 of a vehicle displayed in the plot 140. Similarly, multiple traces 152 and 156 may be shown at a given elevation angle (such as the horizon) to compare different antennas or DSRC radios or multiple graphs form the same DSRC system may be plotted and statistically analyzed across a selected elevation range. In this example, the transmitting power may have been specified as 22 dBm.

FIG. 9 illustrates an example plot 180 of received packet error rate (PER) from the receive path on a sample VUT and DSRC system. For example, the transmit power may have been set to 20 dBm. A trace 184 of PER shows a consistent PER below 10%. In various implementations, an acceptable PER trace may be defined as PER less than a predetermined threshold (such as 10%) for every measured azimuth angle and elevation range. In various implementations, additional concentric circles may be shown that correspond to higher PER values—for example, 70%, 80%, 90%, and 100%.

For example only, the PER may be captured after a previous calibration process to set a relatively low reference receive signal strength level at the center of the turntable or centered at the vehicle. Such a method of measurement on the DSRC system receive path may be used to flush out non-circular receive coverage, and also expose desense issues in the DSRC radio receiver due to noise generated by other systems on the vehicle. The measurement of the transmit and receive paths on the vehicle are performed while the vehicle is active. Without such an active vehicle requirement, the VUT may pass 5.9 GHz coverage certification for deployment when it should have failed.

Block Diagram

In FIG. 10, the testing system 80 includes a control system 200, a DSRC packet generator 236, and a signal analyzer 240. In some implementations, turntable control 208 and gantry control system 212 may be part of the testing system 80 or may be provided by a facility that provides the gantry 32 and the turntable 40. The DSRC instrumentation antenna 42. The DSRC instrumentation antenna 42 is mounted to the gantry 32, and may be considered to be part of the testing system 80.

The control system 200 includes a test control module 202 that operates under the control of a user interface module 204 that offers a graphical user interface (GUI). In order to run a test, the test control module 202 sends commands to a turntable controller 208 that controls the rotation of the turntable 40. In addition, the test control module 202 sends commands to a gantry control system 212, which may include a gantry 32 that controls the vertical positioning and orientation of the DSRC instrumentation antenna 42.

The DSRC instrumentation antenna 42 communicates with either an antenna located the DSRC system 26 of the VUT 24 located on the turntable 40 or a calibration antenna as described below. For example, as described in more detail below, a calibration antenna may be placed on the turntable 40. Following calibration, the VUT 24 may be placed onto the turntable 40.

Then, the DSRC instrumentation antenna 42 communicates with an antenna (not shown) of the DSRC system 26 of the VUT 24. For testing purposes, the VUT 24 also includes a Wi-Fi transceiver 232, which communicates with the test control module 202 using a wired or wireless interface for a telemetry link. For example only, the Wi-Fi transceiver 232 may communicate with the test control module 202 using a Wi-Fi or a Bluetooth link. Accordingly, the DSRC system 224, which is connected to the Wi-Fi transceiver 232, may receive instructions from the test control module 202 specifying, for example, the conducted transmission power and/or transmission channel for the transmit path of the DSRC system 26. Furthermore, the Wi-Fi transceiver 232 may transfer from the DSRC system 26 and communicate the data to the test control module 202. For example only, the Wi-Fi transceiver 232 may attach to a debugging interface, such as a serial port, Ethernet, or USB connection of the DSRC system 26.

To test receive path performance of the DSRC system 26, the test control module 202 controls the channel and output power of a programmable DSRC packet generator 236, which generates packets for transmission to the DSRC system of the VUT 24. As the packets are received at the DSRC system 26, packet error rate (PER) is calculated by the DSRC system 26. The PER is reported back to the test control module 202 in real-time via the Wi-Fi transceiver 232.

Meanwhile, to test transmission characteristics of the DSRC system 26, a radio frequency (RF) signal analyzer 240 measures radiated power of the DSRC signals broadcast by the DSRC system 26 and provides this information to the test control module 202. In other implementations, the signal analyzer 240 may be a spectrum analyzer.

As an example, in the transmit path test, the measurement system records in real-time a statistical average, standard deviation, percent of measurements below a threshold, and absolute minimum power values in four distinct regions around the horizon sector of the vehicle. The regions may include a front, rear, left, and right semi-circle coverage regions in the horizon sector. The horizon sector is defined as the full azimuth coverage (e.g., 360° around the vehicle), including the horizon and elevation angles in a small band above and below the horizon.

As described in more detail below, the test control module 202 stores calibration values into calibration storage 244. Test results are stored into test storage 248. A plot generator 252 produces a visual representation of test data from the test storage 248 for display to the user. For example, the plot generator 252 may generate polar plots of radiated power and received packet error rate. Further, the plot generator 252 may update the polar plot in real time as the turntable 40 rotates; accumulate plots for each elevation angle while updating the statistics in real-time. The performance result may be immediately available once the last plot in the horizon sector is completed.

A test control interface 256 allows a user to start, pause, and stop tests. The test control interface may also allow a user to start, pause, and stop the generation of polar plots and corresponding statistics. The test control interface 256 sends control signals to the test control module 202. The test control interface 256 may also communicate to the test control module 202 when a calibration antenna is in place on the turntable 40 and when the VUT 24 is in place on the turntable 40. Once the appropriate device is present, the test control module 202 can continue with testing.

A test mode selector 260 may allow a user to select transmit diversity mode, receive diversity mode, or a combination of the two. The test mode selector 260 may also specify other parameters of a test, such as which elevation angle should be set for the radiated power or PER evaluation. In various implementations, the elevation angle may be set within a range from 80° through 96°. A receive settings selector 264 allows the user to enter parameters for a receive test, such as transmission data rate, transmission power, and packet length. Further, the receive settings selector 264 automatically annotates the DSRC channel, DSRC radio conducted power setting, and elevation angle used for each generated plot.

A transmit settings selector 268 allows the user to specify parameters such as transmission data rate, transmission power, transmission interval, and packet length. A user may choose to vary the transmission power of the DSRC system 26 in order to test the compliance of the DSRC system 26 for various traffic scenarios. For example only, a congestion control system may be implemented into the vehicle 10-1 (not shown), and it may be configured to control the transmission power of the DSRC system 20-1 (not shown) based on a velocity of the vehicle 10-1 and vehicle density levels on the roadways the vehicle 10-1 is using and/or is nearby to. As an example, an operator of the vehicle 10-1 may not need to communicate with other vehicles located on a road with high vehicle traffic, since the operator likely can determine he or she must slow down due to an accident or heavy vehicle congestion. Accordingly, the vehicle 10-1 may reduce the transmission power of the DSRC system 20-1 when the vehicle 10-1 is on a road with high traffic. Additionally or alternatively, the transmission power of the DSRC system 20-1 may be inversely proportional to the vehicle speed and the amount of traffic on the roadway. Furthermore, the rate at which the vehicle 10-1 transmits packets can be slowed in high vehicle density conditions to reduce over-the-air congestion.

A frequency channel selector 272 allows the user to select a frequency for either transmission or reception testing. As an example, the user may select a 10 MHz channel in the operating frequency range, which might be identified as channel 172, 174, 176, 178, 180, 182, or 184. For example only, the testing system 80 or portions of the testing system 80, such as the user interface module 204, may be implemented by a laptop computer, a desktop computer, a tablet or other mobile device, etc.

Flowchart

In FIG. 11A and FIG. 11B, example operation of the test environment is shown. Control begins at 300, where if a selection is made to test the DSRC radiated power, control transfers to 304; otherwise, control transfers to FIG. 11B.

At 304, if the last calibration performed for the selected position/orientation of the measurement antenna is older than a predetermined threshold, control transfers to 308; otherwise, control transfers to 336. The threshold may be determined based on the drift rate of the measurement antenna. For example, calibrations may need to be performed each day that the measurement system is used. At 308, control begins a calibration process by placing a calibration antenna at a center of the test area on a pedestal and connecting a DSRC packet generator to the calibration antenna. For example only, the calibrated antenna may be a directional antenna paired with an instrumentation-grade signal source.

At 312, a test operator moves a DSRC instrumentation antenna to an elevation matched to the calibration antenna on a pedestal. At 316, control commands a known radiated power to be the output from a combination of the DSRC packet generator and the calibration antenna. At 320, control measures a radiated power value using a signal analyzer.

At 324, control calculates a power offset between the known transmitted power and the measured radiated power. This power offset may allow for compensation of system losses. At 328, control records the power offset in the test software. At 332, the operator removes the calibration equipment from the test area and then transfers to 336. At 336, the test operator places the VUT onto the turntable. In some implementations, the DSRC antenna of the vehicle will be located at the center of the turntable. However, in other implementations a center of the vehicle (when viewed in a plan view) is centered in the turntable, so an antenna that is not located at the exact center of the vehicle will not be centered on the turntable.

At 340, the operator adjusts the height of the gantry arm for the local horizontal. At 344, control begins to rotate the turntable at a predefined angular velocity. At 348, the operator moves a DSRC instrumentation antenna to a first elevation.

At 352, control commands the VUT to begin transmitting at a first power over a first channel for the transmit path test. To ensure the accuracy of the transmit test, control may have to perform a test run to verify that the vehicle DSRC system is transmitting at the selected first power. As an example, if the operator, using the Tx settings selector module, sets the transmission power at 15 dBm, and the DSRC system is transmitting at 14 dBm, then adjustments may need to be made to the input in order to ensure the 15 dBm test is accurate. As such, the operator may need to set the transmission power at 16 dBm in order to accurately test the compliance of the DSRC system at 15 dBm.

At 356, control measures the radiated power at discrete azimuth angles by adding the power offset to the power measured by the signal analyzer. At 360, control updates real-time statistical values of the measured radiated power and subsequently updates a display with the real-time statistical values. As an example, the real-time statistical values may include an average, standard deviation(s), absolute minimum, absolute maximum, etc., of the measured radiated power of the DSRC system of the VUT.

At 364, control determines whether the radiated power for a 360° azimuth is complete. If so, control transfers to 368; otherwise, control returns to 356. At 368, control determines whether additional channels need to be tested for the first power. If so, control transfers to 372; otherwise, control transfers to 376. At 372, control commands the VUT to transmit a signal at the same power, but over the next channel selected by the operator. Control then returns to 356.

At 376, control determines whether additional transmission powers need to be tested. If so, control transfers to 380; otherwise, control transfers to 388. At 380, control commands the VUT to transmit a signal at the next power selected by the user, but over the first channel selected by the user. Control then returns to 356.

At 384, control determines whether additional measurement elevations need to be measured for the DSRC system. If so, control transfers to 388; otherwise, control transfers to 392. At 382, the operator moves the DSRC instrumentation antenna to the next elevation and then returns to 356. At 392, control commands the VUT to stop transmitting, and then commands the turntable to stop rotating at 396. At 398, control assesses the performance of the DSRC system based on a variety of statistical values and thresholds, including, for example only, an average, standard deviation(s), absolute minimum, absolute maximum, etc., of the measured radiated power of the DSRC system of the VUT. Control then transfers to FIG. 11B.

In FIG. 11B, control enters at 400 from FIG. 11A. If an indication has been received that the DSRC system PER is to be tested, control transfers to 408; otherwise, control transfers to 404. At 404, control determines whether testing should be ended. If so, control ends; otherwise, control returns to 300 of FIG. 11A.

At 408, if the last calibration performed for the selected position/orientation of the measurement antenna is older than a predetermined threshold, control transfers to 412; otherwise, control transfers to 444. At 412, the operator places the calibration antenna and the signal analyzer on a pedestal at the center of the test area. At 416, the operator moves the DSRC instrumentation antenna to an elevation that is equal to the calibration antenna. At 420, control begins transmitting DSRC packets through the DSRC instrumentation antenna at a predetermined power. For example, the predetermined power may be a maximum value of transmission power. At 424, control measures the radiated power at the signal analyzer and offsets the value according to the calibration antenna gain and cable loss in the system. At 428, control commands the DSRC instrumentation antenna to stop transmitting DSRC packets. At 436, control determines the offset between the radiated power and the target power and records the transmit power as the predetermined power in addition to the offset at 436. At 440, the operator removes the calibration equipment from the test area and transfers to 444.

At 444, the test operator places the VUT onto the turntable. At 448, the operator adjusts the height of the gantry arm for the local horizontal. At 452, control begins to rotate the turntable at a predefined angular velocity. At 456, the operator moves a DSRC instrumentation antenna to a first elevation. At 460, control transmits DSRC packets through the DSRC instrumentation antenna on a first channel at the recorded transmit power. At 464, control measures the PER at predetermined time intervals (e.g., 100 ms) based on the DSRC packets received at the VUT.

At 468, control updates real-time statistical values of the measured radiated power and subsequently updates a display with the real-time statistical values. As an example, the real-time statistical values may include an average, standard deviation(s), absolute minimum, absolute maximum, etc., of the measured radiated power of the DSRC system of the VUT.

At 472, control determines whether the radiated power for a 360° azimuth is complete. If so, control transfers to 476; otherwise, control returns to 464. At 476, control determines whether additional channels need to be tested for the first power. If so, control transfers to 480; otherwise, control transfers to 484. At 480, control transmits DSRC packets through the DSRC instrumentation antenna on the next channel selected by the operator. Control then returns to 464.

At 484, control determines whether additional measurement elevations need to be measured for the DSRC system. If so, control transfers to 488; otherwise, control transfers to 492. At 488, the operator moves the DSRC instrumentation antenna to the next elevation and then returns to 460. At 492, control commands the DSRC instrumentation antenna to stop transmitting DSRC packets, and then commands the turntable to stop rotating at 496. At 498, control assesses the performance of the DSRC system based on a variety of statistical values and thresholds, including, for example only, an average, standard deviation(s), absolute minimum, absolute maximum, etc., of the measured radiated power of the DSRC system of the VUT. Control then returns to 404.

In FIG. 12, a flowchart showing a method to design DSRC antennas while on the vehicle by optimizing both the design parameters and the on-vehicle coverage is shown. Control begins at 500 when the test operator places the VUT onto the turntable. At 504, the operator adjusts the height of the gantry arm for the local horizontal. At 508, the operator places the adjustable antenna of the DSRC system at a first location on the VUT. At 512, control begins to rotate the turntable at a predefined angular velocity. At 516, the operator selects a first geometrical and/or electrical parameter of the adjustable antenna. For example only, the operator may select an angle between two patches of the adjustable antenna or an elevation of two patches of the adjustable antenna. A patch antenna is a rectangular microstrip antenna but other antennas and antenna components can be used.

At 520, control sets the adjustable antenna to the selected geometrical and/or electrical parameter to a first value selected by the operator. At 520, control moves the DSRC instrumentation antenna to the first elevation selected by the operator. At 524, control moves the DSRC instrumentation antenna to the first elevation set by the user. At 528, control commands the DSRC system of the VUT to begin transmitting at a rated maximum power and a predetermined channel specified by the operator. At 532, control measures the radiated power at various discrete azimuth angles by adding a power offset to the power measured by the signal analyzer. As described above with reference to FIG. 11A, the power offset may be determined by the calibration process of the DSRC radiated power test. At 536, control updates real-time statistical values of the measured radiated power and subsequently updates a display with the real-time statistical values. As an example, the real-time statistical values may include an average, standard deviation(s), absolute minimum, absolute maximum, etc., of the measured radiated power of the DSRC system of the VUT.

At 540, control determines whether the measurements of the radiated power for a 360° azimuth are complete. If so, control transfers to 544; otherwise, control returns to 532. At 544, control determines whether additional elevation angles need to be measured for the DSRC system of the VUT. If so, control transfers to 548; otherwise, control transfers to 552. At 548, control moves the DSRC instrumentation antenna to the next elevation selected by the operator to be tested and returns to 532.

At 552, control commands the DSRC system of the VUT to stop transmitting a signal. At 556, the operator determines the next geometrical/electrical parameter of the adjustable antenna in order to optimize a statistical value. As an example, the operator may determine that the standard deviation needs to be minimized as a result of the standard deviation not satisfying a predetermined threshold standard deviation. At 560, control determines whether the difference between the current geometrical and/or electrical parameter statistical values and the next statistical values are greater than a predetermined threshold. If so, control transfers to 564; otherwise, control transfers 568. At 564, control sets the selected geometrical and/or electrical parameter of the adjustable antenna to the next value and returns to 524.

At 568, control determines whether additional geometrical and/or electrical parameters of the adjustable antenna need to be tested. If so, control transfers to 572; otherwise, control transfers to 576. At 572, the operator selects the next value of the geometrical and/or electrical parameter of the adjustable antenna to be tested and returns to 520. At 576, control determines whether additional mounting locations of the adjustable antenna need to be tested. If so, control transfers to 580; otherwise, control transfers to 588. At 580, control commands the turntable to stop rotating and transfers to 584. At 584, the operator moves the adjustable antenna to the next location on the VUT and returns to 512. At 588, the operator selects the geometrical and/or electrical parameter and location of the adjustable antenna that has the best figure of merit for a non-variable antenna design of the VUT and then ends.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The invention claimed is:

1. A computerized method of characterizing a dedicated short-range communications (DSRC) system that includes at least one DSRC device for use with a vehicle-to-vehicle communication system, the method comprising:
   positioning a vehicle under test (VUT) at a first location, wherein the VUT includes the DSRC system;
   positioning a DSRC instrumentation antenna at a second location spaced apart from the first location;
   varying an azimuth angle between the DSRC device and the DSRC instrumentation antenna by performing a rotation of (a) the VUT in place at the first location while leaving the DSRC instrumentation antenna fixed in the second location or (b) the DSRC instrumentation antenna in a circular path about the first location while leaving the VUT fixed in the first location; and
   for each of a plurality of specified azimuth angles, testing receive performance of the DSRC system by:
      transmitting DSRC packets through the DSRC instrumentation antenna to the DSRC system;
      receiving DSRC packets at the DSRC system and estimating an error rate indicating a level of success of DSRC packets being received by the DSRC system; and
      recording the error rate corresponding to the specified azimuth angle.

2. The method of claim 1 wherein the error rate is a packet error rate.

3. The method of claim 1 wherein the VUT includes an internal combustion engine, the method further comprising placing the internal combustion engine is in a running state while testing the receive performance of the DSRC system.

4. The method of claim 1 further including automatically plotting the error rate as a function of azimuth angle on a graphical display during the rotation.

5. The method of claim 1 wherein the DSRC instrumentation antenna is positioned at the second location at a specified elevation angle relative to a vertical ray originating at the DSRC device.

6. The method of claim 1 further comprising performing the transmitting, receiving, and recording for each of the plurality of specified azimuth angles over a plurality of specified elevation angles between the DSRC device and the DSRC instrumentation antenna.

7. The method of claim 6 further comprising iteratively adjusting the elevation angle between the DSRC device and the DSRC instrumentation antenna after at least one entire instance of the rotation is complete.

8. The method of claim 1 further comprising testing transmit performance of the DSRC system by, for each of the plurality of specified azimuth angles:
   instructing the DSRC system to transmit DSRC packets to the DSRC instrumentation antenna;
   measuring a radiated power received through the DSRC instrumentation antenna at power measurement instrumentation; and
   recording a radiated power value corresponding to the specified azimuth angle based on the measured radiated power.

9. The method of claim 8 further comprising performing a calibration procedure by, while the VUT is not present at the first location:
   placing a calibration antenna at the first location;
   transmitting a known power level of radiated power from a DSRC packet generator through the calibration antenna;
   measuring a power level at the power measurement instrumentation;
   calculating a power offset value between the measured power level and the known power level; and
   prior to recording the radiated power value based on the measured power, applying the power offset to the measured power.

10. The method of claim 8 wherein the power measurement instrumentation includes a radio frequency (RF) signal analyzer.

11. The method of claim 8 wherein the instructing the DSRC system to transmit DSRC packets is performed by communicating instructions from a test control system to the DSRC system over a telemetry link.

12. The method of claim 11 wherein the telemetry link includes a wireless local area network.

13. The method of claim 1, wherein the varying the azimuth angle between the DSRC device and the DSRC instrumentation antenna is performing by rotating a turntable on which the VUT is positioned.

14. The method of claim 1 further comprising transmitting the error rate for each of the plurality of specified azimuth angles to from the DSRC system to a test control system over a telemetry link.

15. A computerized method of automated antenna design for a dedicated short-range communications (DSRC) system that includes at least one DSRC device for use with a vehicle-to-vehicle communication system, the method comprising:
    positioning a vehicle under test (VUT) at a first location, wherein the VUT includes the DSRC system;
    positioning a DSRC instrumentation antenna at a second location spaced apart from the first location;
    selecting a first value for a first parameter of a configurable antenna of the DSRC system;
    configuring the first parameter of the configurable antenna to attain the selected value;
    varying an azimuth angle between the DSRC device and the DSRC instrumentation antenna by performing a rotation of the VUT in place at the first location while leaving the DSRC instrumentation antenna fixed in the first location;
    performing a transmission test of the DSRC system by, at each of a plurality of specified azimuth angles:
    instructing the DSRC system to transmit DSRC packets to the DSRC instrumentation antenna;
    measuring a radiated power received through the DSRC instrumentation antenna; and
    recording a radiated power value corresponding to the specified azimuth angle based on the measured radiated power;
    determining a statistical value representative of the radiated power values for the plurality of specified azimuth angles;
    adjusting the selected value to optimize the statistical value; and
    selectively repeating the configuring, the varying, the performing, the determining, and the adjusting until an optimized value for the first parameter is determined.

16. The method of claim 15 wherein the first parameter is one of (i) a physical angle between two components of the configurable antenna and (ii) an orientation of at least one component of the antenna with respect to a horizon reference plane parallel to a plane on which the VUT rests.

17. The method of claim 16 wherein the statistical value is a standard deviation and wherein optimizing the statistical value includes minimizing the statistical value.

18. The method of claim 15 further comprising adjusting a location of the configurable antenna on the VUT and selectively repeating the configuring, the varying, the performing, and the determining until an optimized location for the configurable antenna is determined.

19. The method of claim 15 further comprising selectively repeating the configuring, the varying, the performing, the determining, and the adjusting for a second parameter of the configurable antenna until an optimized value for the second parameter is determined.

* * * * *